Sept. 20, 1938.  F. FISCHER  2,130,384
RECTIFIER
Filed Feb. 1, 1938

Inventor:
Franz Fischer
by R. C. Hopgood
Attorney

Patented Sept. 20, 1938

2,130,384

UNITED STATES PATENT OFFICE 2,130,384

RECTIFIER

Franz Fischer, Berlin, Germany, assignor to Suddeutsche Apparate-Fabrik G. m. b. H., Nuremberg, Germany, a company Application February 1, 1938, Serial No. 188,073
In Germany February 8, 1937

1 Claim. (Cl. 175—366)

The invention relates to rectifiers of the kind in which layers of suitable materials are assembled to form rectifier units or elements. More particularly the invention refers to rectifiers in which one of such layers, constituting one of the electrodes, is made of a metal of the iron group, while a second layer, fitted to the former, consists of suitably prepared selenium, a third layer, applied to this selenium layer, being the other electrode.

Figure 1:
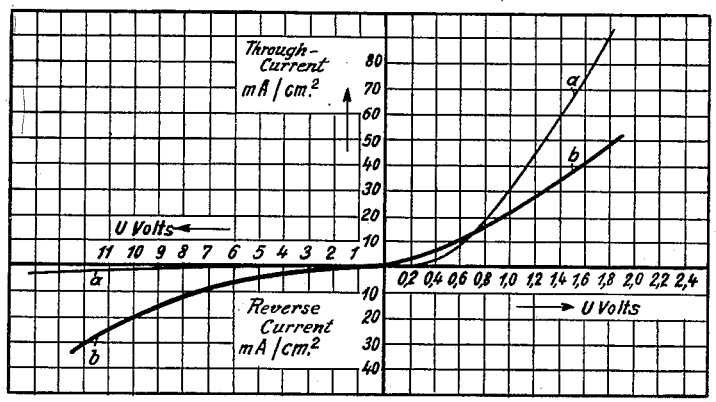
Figure 2:
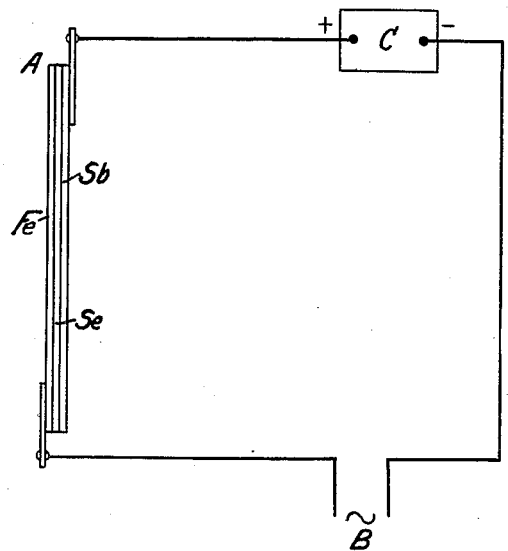

The invention will be understood from the following description and be particularly pointed out in the appended claim, reference being had to the accompanying drawing in which Fig. 1 is a graphic representation which serves to explain the function of the novel rectifier as compared with selenium-metal rectifiers of known construction. Fig. 2 is a side view of one embodiment of the invention and also shows the wiring diagram of a circuit therefor.

In Fig. 1, $a$ is the characteristic curve of the known rectifiers, while $b$ is the characteristic curve obtained by the invention, these curves illustrating the respective ratios of current and voltage. Curve $a$ shows that in the case of low voltages, applied to a selenium-metal rectifier of the known construction, the through-current, that is, the current allowed to pass through the rectifier, is very small. Only from say 0.3 volt onward this current is increasing more rapidly than the voltages applied in this way. With the through-current thus increasing the rectifier ratio, upon which the efficiency of the rectifier depends, that is, the ratio between through-current and reverse current, is likewise rapidly bettering. In the case of 0.4 volt the conductivity of such known rectifiers, and thus the rectifier ratio, is suitable in certain cases.

However there are cases in which even the low voltage drop of 0.4 volt would be too high, this being so with measuring valve arrangements, for instance. Therefore selenium-metal rectifiers as hitherto constructed are not adapted for use with measuring instruments of certain high degrees of sensitivity.

Curve $b$ shows that rectifiers as provided by the invention are of sufficient conductivity even if the voltages applied to them are smaller than those for which the known selenium-metal rectifiers are suitable.

The rectifier unit A shown in Fig. 2 comprises three layers, namely a disc Fe made of a metal of the iron group, a layer Se of selenium, and a layer Sb of antimony or an alloy thereof. Layer Se is firmly melted onto disc Fe and hereupon is made to assume the grey-crystalline metallic condition by subjecting it to certain thermal formation processes which in part are effected with the aid of pressure. Layer Sb may be fitted to layer Se by vaporization, for instance.

Disc Fe may be composed of a light metal and a metal of the iron group arranged as a coating thereon.

B denotes an alternating current source, while C denotes a continuous current consuming device of any kind, Fe and Sb thus serving as electrodes.

The main feature of the invention is that the layer Sb is of antimony or an alloy thereof. This layer may be applied to layer Se by any suitable method, for example, by a vaporization method which has proven particularly advantageous for such construction.

A comparison of the two curves $a$, $b$ shows that with smaller voltages, as 0.2 volt, the conductivity in the through-direction of the novel rectifier is by far higher than with the known devices of this type. With higher voltages, it is true, conductivity and rectifier ratio of the novel device are worse than is the case with the known devices. This fact, however, need not be considered here since the novel device is intended for very low voltages, that is, voltages with which the novel rectifier is superior to any other selenium-metal rectifiers.

It will thus be seen that the novel device is adapted to be employed as a rectifying valve in connection with high quality measuring instruments. The advantages in such case are as follows.

Suppose a moving coil instrument if connected to a selenium rectifier of a known construction to need a voltage of say 0.4 volt for a complete deflection of its pointer. Then with the aid of the novel rectifier the same deflection is obtained by applying a voltage of 0.2 volt, the watt consumption and hence the losses in the instrument being accordingly less than in the first case. Such differences will be valuable especially if extremely small currents or voltages are to be ascertained by means of a measuring valve instrument.

Furthermore, by employing the novel rectifier in a measuring arrangement the advantage is obtained that the scale of the measuring instrument is of proportional course even in the range of small values of measurement, whereby also in the lower range of the scale an exact reading is rendered possible.

Rectifiers as provided by the invention will be useful also in connection with other arrangements, and they will be so whenever the voltages applied to the rectifiers are desired to be smallest.

What is claimed is:

A rectifier comprising a disc made of a metal of the iron group, a selenium layer applied to this disc, and a layer of antimony or an alloy of antimony applied to the selenium layer, such antimony layer and the said metal disc being the electrodes of the rectifier.

FRANZ FISCHER.